Nov. 2, 1965  J. H. COULTER, JR  3,215,099
CHEMICAL AND HEAT RECOVERY APPARATUS
Filed Aug. 28, 1962  2 Sheets-Sheet 1
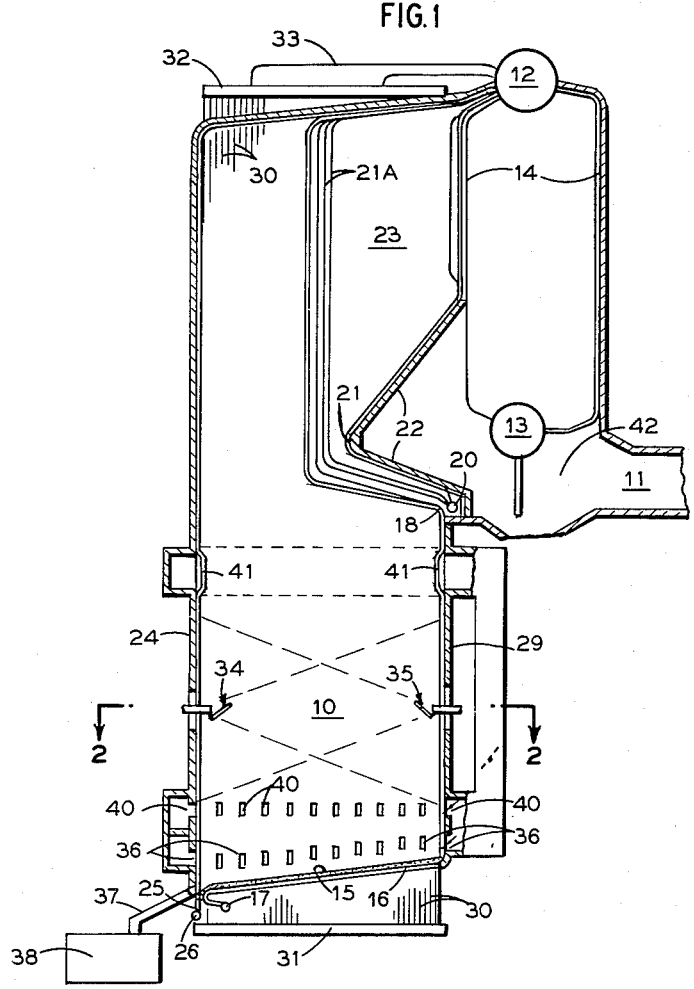
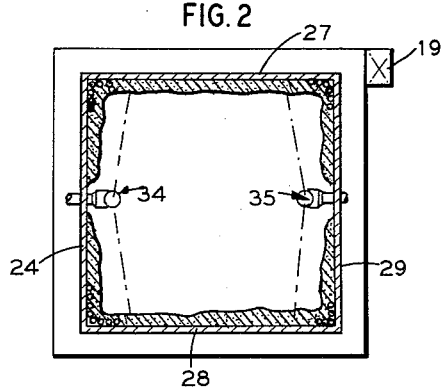
INVENTOR.
James H. Coulter, Jr
BY
J. P. Moran
ATTORNEY Nov. 2, 1965 J. H. COULTER, JR 3,215,099
CHEMICAL AND HEAT RECOVERY APPARATUS
Filed Aug. 28, 1962 2 Sheets-Sheet 2

INVENTOR.
James H. Coulter, Jr
BY
ATTORNEY

3,215,099
CHEMICAL AND HEAT RECOVERY APPARATUS
James H. Coulter, Jr., Silver Lake, Cuyahoga Falls, Ohio, assignor to The Babcock & Wilcox Company, New York, N.Y., a corporation of New Jersey
Filed Aug. 28, 1962, Ser. No. 219,896
3 Claims. (Cl. 110—7)

The present invention relates to the recovery of chemicals and heat from waste liquor containing inorganic chemicals and combustible organic matter, and more particularly to the recovery of chemicals and heat from the pulp digester residual liquor obtained in the manufacture of paper pulp.

In the incineration of residual liquor, such as the "black liquor" resulting from the sulphate process of digesting wood for paper pulp manufacture, the liquor is concentrated to a desirable solids content and sprayed into a furnace. As disclosed in U.S. Patent 2,161,111, the liquor spray is projected across a furnace so as to be in contact with an ascending stream of hot gases. During the flight of the liquor spray across the furnace it is partially dehydrated and upon contacting a wall of the furnace will be deposited thereon. While the liquor adheres to the wall of the furnace it is subjected to further dehydration and the removal of some volatile matter, forming a porous mass which will tear away from the walls and be deposited by gravity on a hearth at the bottom of the furnace. The chunks or masses of porous liquor residue will be in the form of a char and while on the hearth the organic material will be burned under reducing conditions while at the same time inorganic chemicals will be reduced by smelting.

The smelt discharges from the hearth in the form of a molten stream and is collected in a dissolving tank for subsequent treatment incident to the recovery of the chemicals. The hot combustion gases rising from the mass of char on the hearth partially dehydrate the incoming liquor spray and are subsequently utilized in the vaporization of, for example, water in the production of steam. In the usual chemical recovery furnace of the type herein described some of the air, known as primary air, is injected into the mass of char maintained on the furnace hearth. This air is insufficient in quantity to consume all of the combustibles present in the mass on the hearth and usually additional air is injected into the gases ascending through the furnace so as to consume all the combustibles in those gases. The additional air is introduced through secondary air ports located upwardly adjacent the primary air ports and below the level of the burners spraying the liquor into the furnace. In some installations it is desirable to introduce additional air above the location of the liquor spray introduction for tempering the gases of combustion and/or to further insure complete combustion of all of the combustibles in the gases rising through the furnace.

In the incineration of residual liquor by the procedure described it is highly desirable to insure the deposition of liquor in relatively thin layers over an extended area of the walls. Such a procedure is conducive to maximum chemical and maximum heat recovery and minimizes loss of chemicals. This distribution of the liquor is commonly accomplished by the use of an oscillating spray nozzle with the nozzle constructed to discharge the liquor in a thin sheet which extends through an angle approaching 180°. The sweep of the nozzle is obtained by oscillating the nozzle about a transverse horizontal axis, as well as by oscillation about the longitudinal axis of the nozzle. A suitable structure for oscillation of a spray nozzle of the type described is disclosed and claimed in U.S. Patent 2,541,695.

With the oscillating nozzle described above and shown in detail in the last mentioned patent, liquor is deposited on three of the walls of the furnace. This is illustrated in particular in FIGURES 5 and 6 of the U.S. Patent No. 2,541,695. With increase in the capacity of chemical recovery furnaces, it has become necessary to increase the size of the furnace wall area contacted by the liquor spray. Operating experience has shown there are definite limits in the weight of liquor deposited which is capable of being dehydrated by a unit of wall area exposed to the furnace gases, and when this limit is exceeded difficulties arise in the conditioning of the char subsequently treated on the hearth of the furnace.

In the present invention an arrangement of liquor deposition is provided which utilizes all four of the walls of a chemical recovery furnace for depositing the partially dehydrated liquor to thereby increase the wall area available for preliminary dehydration and preparation of the char subsequently deposited on the hearth of a chemical recovery furnace. In the present invention a pair of spray nozzles are utilized wherein the nozzles are positioned substantially midway of the opposite walls of the furnace, and at substantially the same elevation. Heretofore it was believed that such an arrangement of nozzles would lead to operating difficulties due to interference set up by contact between the sheets of liquor spray projected into the furnace before the liquor could be deposited on the furnace walls. With proper operation of the spray nozzles it has been found that such interference does not adversely affect deposition of liquor on the walls of the furnace and proper preparation of the char subsequently deposited by gravity on the furnace hearth. It has been found that the opposing spray nozzles may be satisfactorily operated either with the upper and lower sweep limits for wall deposit beneath the level of the spray nozzles, or with the upper limit above the spray nozzle level. It has also been found that both nozzles can be satisfactorily operated with oscillation about a transverse horizontal axis alone, or with oscillation about both the transverse axis and the nozzle axis. With the described arrangement each wall in which a spray nozzle is positioned receives a well distributed mass of sprayed liquor from the nozzle in the opposite wall, while each of the side walls receives a similarly well distributed mass of liquor from each of the spray nozzles, the spray distribution from the nozzles being largely complementary, without excessive deposition of liquor at any particular area on the furnace side walls.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

FIG. 1 is an elevation, in section, of a heat and chemical recovery unit constructed and arranged in accordance with the invention;

FIG. 2 is a section taken on line 2—2 of FIG. 1;

Figure 3:
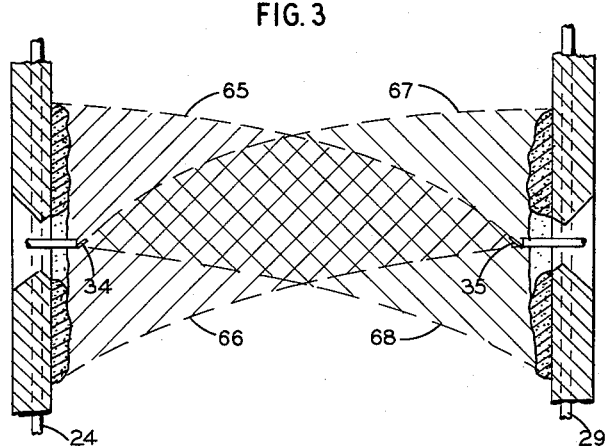
FIG. 3 is an enlarged section of a portion of the furnace at the burners as shown in FIG. 1.

As shown in FIG. 1 the invention is illustrated as applied to a chemical and heat recovery unit of known type where residual black liquor is incinerated in the lower portion of a furnace 10 with the gaseous products of combustion cooled in passing over heat exchange surfaces and thereafter passed through a gas outlet 11 to secondary heat recovery elements, such as liquor evaporators (not shown).

The steam generating unit includes upper and lower drums 12 and 13, respectively, connected by tube banks 14 of steam generating tubes. The walls of the furnace 10 are also provided with upright rows of steam generating tubes which are connected into the circulating system of the steam generator.

The furnace is of generally rectangular horizontal cross section, as shown in FIG. 2 and is provided with an inclined water cooled hearth 15, having tubes 16 therein which receive water from a transverse header 17 with the water flowing upwardly through the tubes 16 of the hearth 15. The hearth tubes are then bent to provide vertically extending tubes to form wall 29 of the furnace as shown in FIG. 1. Above the furnace portion of the unit, the tubes are bent inwardly as at 18, to extend transversely into the furnace portion of the unit, and thence upwardly and finally rearwardly discharging the water as well as the steam generated therein into the upper drum 12. Other tubes 21 supplied with water from a header 20 which is positioned intermediate the height of the unit, and connected with the drum 13 are bent to form a nose baffle 22 and are then arranged to form rows of vertically extending screen tubes ahead of tube bank 14. A cavity 23 is formed between the banks 14 of vapor generating tubes and the upward extension of the wall tubes 18. Other tubes 21A extend from the header 20 generally parallel to the upper extensions of wall tubes 16 to the drum 12. Normally, a bank of superheating tubes (not shown) is positioned in the cavity 23.

The opposite or front wall 24 of the furnace 10 is lined with upright tubes 25 supplied with water from a transverse lower header 26 which is connected into the circulatory system of the boiler. At the upper end of the wall 24 the tubes are bent rearwardly to open into the upper drum 12. The side walls 27 and 28 of the furnace 10 (see FIG. 2) are likewise each lined by vapor generating tubes 30 which extend upwardly from horizontally disposed headers 31 connected in the circulatory system of the boiler to upper headers 32 positioned generally at the level of the upper drum 12 and connected thereto by riser tubes 33 for the discharge of the steam and water mixture generated in the side wall tubes 30.

In the usual chemical and heat recovery furnace utilizing a residual black liquor as a fuel, the tubes 16, 25 and 30 defining the walls of the furnace are covered by an initially plastic refractory material so as to reduce the cooling effect of the tubes in the fuel ignition and combustion portions of the furnace 10.

In accordance with the invention, residual black liquor is introduced into the furnace for heat and chemical recovery in the form of a liquid spray which is discharged from the nozzles 34 and 35 positioned in opposite walls of the furnace. Each nozzle discharges the liquor as a sheet of coarse spray extending through an angle of approximately 180°. The liquor spray discharged from each nozzle in crossing the furnace comes into intimate contact with the streams of hot gases rising from the hearth, which partially dehydrates the liquor so that, upon contact with the wall of the furnace, the liquor deposits thereon. The rising streams of hot gases further dehydrate the liquor deposited on the furnace walls, with the char or dried liquor then falling from the walls, as lumps of substantially dried solids, to the hearth 15 at the bottom of the furnace.

The dried liquor or char deposited on the hearth is impacted by streams of primary combustion air, which are directed into the mass of char through primary air ports 36 positioned upwardly adjacent the hearth 15 in all four walls of the furnace. The primary air flow is insufficient for the complete combustion of the organic matter in the liquids, but the partial combustion of the organics reduces the inorganic chemicals therein, with the inorganic chemicals discharging from the furnace 10 in the form of a liquid smelt through a spout 37 leading to a dissolving tank 38 for subsequent treatment of the recovered chemicals. The gases created by the reducing action of the primary air rise from the char bed on the hearth and are contacted by streams of secondary air introduced into the furnace from secondary air ports 40 positioned in all four walls upwardly adjacent the primary air ports 36. The introduction of the secondary air substantially completes the combustion of the organic materials suspended in the gases rising in the furnace 10 and provides heat for the dehydration of the liquor introduced into the furnace through the spray nozzles 34 and 35.

As shown in FIGURE 1, tertiary air is introduced into the furnace through air ports 41 positioned in the front and rear walls 24 and 29 respectively of the furnace and downwardly adjacent the nose baffle 21. The tertiary air assures mixing of the gases to complete the combustion of the combustibles entrained in the gases rising from the hearth, to eliminate long flame travel and reduces the temperature of the gases passed over the convection heating surfaces 21A, 23 and 14. Some of the solids entrained in the gases passing through the tube banks 14 are separated therefrom by reason of changes in gas velocity and flow direction and are deposited in a hopper 42 located beneath the lower drum 13 of the boiler.

Combustion air may be delivered to the furnace from an external source (not shown) through a duct 19, with the air controllably divided and separately delivered to the ports 36, 40 and 41 through suitable valved ducts.

As shown in FIGS. 1 and 2, the nozzles 34 and 35 are located in opposite walls of the furnace 10, i.e., the front and rear walls 24 and 29, respectively, with each nozzle positioned substantially mid-way transversely of the respective walls and substantially at the same elevation. The nozzles may be oscillated about a transverse horizontal axis, or about the longitudinal axis of the nozzle, or both, to change the area of spray impingement on the walls of the furnace.

Figure 4:
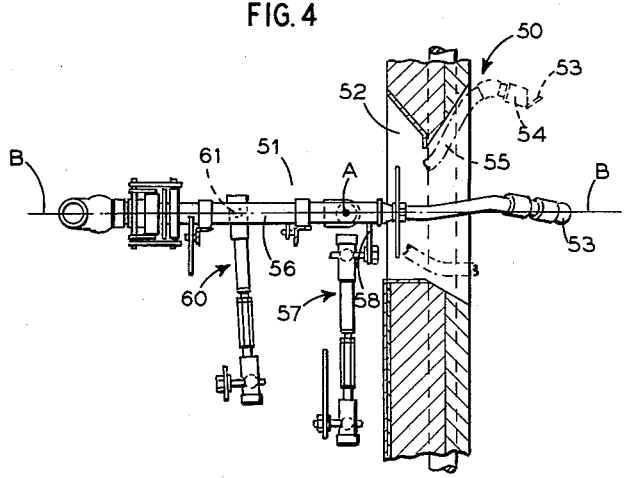
FIG. 4 is an enlarged elevation, partly in section, of a portion of the burner and associated apparatus shown in FIG. 1.

As shown in FIGURE 4, suitable nozzle assembly 50 and its oscillating mechanism 51 are mounted in a port 52 formed in the wall of the furnace. The port 52 is formed between steam generating tubes of the wall, where the tubes may be bent as necessary to enlarge the intertube space therebetween. The nozzle assembly consists of a splash plate 53 which receives a pressurized jet of liquor from a bore formed in a nozzle head 54. The impact of the stream of liquor on the splash plate discharges the liquor from the plate 53 in the form of a fan shaped sheet which may have an included angle approaching 180 degrees. The nozzle head 54 with the splash plate welded thereto is mounted on the end of a pipe 55 which is attached in liquor flow relation to an inlet tube 56. The tube and nozzle assembly is mounted for vertical oscillation about a transverse horizontally disposed axis, indicated at A, and for rotational oscillation about the longitudinal axis B of the tube. In the preferred nozzle assembly the longitudinal axis B of the inlet tube 56 will intersect the surface of the splash plate 53. A drive mechanism 57 including a linkage bar 58 is connected to the tube 56 for rotational oscillation thereof about the longitudinal axis B while a second drive mechanism 60 including a linkage member 61 is attached to the tube 56 on the exterior side of the transverse axis A for vertical oscillation of the tube 56 about axis A. The drive mechanism 57 and 60 may advantageously be motor driven.

Each of the spray nozzles 34 and 35 shown in FIGURES 1, 2, and 3 are provided with a nozzle assembly and an oscillating mechanism as shown in FIGURE 4. Each of the spray nozzles 34 and 35 may be adjusted to discharge the sheet of liquor spray to contact the opposite wall of the furnace over an area extending both above and below the level of the spray nozzle in the opposite wall. A typical pattern of such spray contact is illustrated in FIG. 3. This pattern may be attained by oscillation of the nozzle about the axis A, without utilizing rotation of the nozzle about the axis B (see FIG. 4). If it is desired, the nozzle may be rotated about axis B simultaneously with oscillation about axis A to increase the area of contact of liquor particularly on the side walls of the unit.

To prevent the escape of spray through the opposite wall port, the ports may be provided with a curtain of steam or air jets to deflect the spray of liquor particles approaching the open port so that the particles will impact the adjacent furnace wall areas. As shown in the drawings, FIGS. 2 and 3, the sheet of sprayed liquor discharged by the nozzle 35 will contact the surface of the opposite wall 24, and the side walls 27 and 28 in a pattern defined by the crosshatched area shown between the lines 65 and 66. The extent of the vertical portion of wall area contacted by the spray can be varied by adjusting the amplitude of angular movement of the linkage 60 of the nozzle. The degree of angular oscillation may also be similarly adjusted by linkage bar 57. In a similar manner the sheet of sprayed liquor discharged by the nozzle 34 will contact, and the materials will be deposited upon the wall 29 and side walls 27 and 28 in a pattern defined by the crosshatching bounded by the lines 67 and 68. It will be noted that a portion of the side walls 27 and 28 will receive sprayed liquor from both of the nozzles 34 and 35.

It will be understood that the nozzles 34 and 35 may be supplied equal or unequal quantities of liquor, and that the amplitude of oscillation and angular rates of oscillation of the nozzles may be equal or not, as desired.

Alternately the nozzles 34 and 35 can be so adjusted that the area of contact of the liquor spray from one nozzle will contact the opposite wall of the furnace beneath the level of the other nozzle. This adjustment of nozzle movement can be used when the furnace height is sufficient to provide adequate area for liquor buildup on the spray contacted walls of the furnace below the level of the nozzles.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A furnace comprising upright walls forming a chamber of rectangular horizontal cross-section, a hearth forming the bottom of said chamber, means forming an outlet from the upper portion of said chamber for gaseous products of combustion generated in said furnace chamber, spray nozzle means positioned at a common level and substantially midway of the opposite walls of said chamber, each of said spray nozzle means formed to project a substantially flat coarse spray of combustible liquor through an angle of substantially 180 degrees into and across the upper portion of said chamber in impinging relation with the opposite wall and a portion of the adjoining opposite pair of walls so as to deposit an adhering mass of liquor thereon, and means for continuously oscillating each of said nozzle means to shift the area of impact of said liquor on said wall surfaces.

2. A furnace comprising upright walls forming a chamber of rectangular horizontal cross-section, a hearth forming the bottom of said chamber, means forming an outlet from the upper portion of said chamber for gaseous products of combustion generated in said chamber, spray nozzle means positioned at a common elevation above said hearth and substantially transversely midway in opposite walls of said chamber; each of said spray nozzle means formed to project a sheet-like spray of combustible liquor through an angle of substantially 180 degrees across the upper portion of said chamber and in impinging relation with the opposite wall and the adjoining opposite pair of walls of said chamber so as to deposit an adhering mass of liquor thereon, and means for continuously oscillating each of said nozzle means about a transverse horizontal axis to impact said liquor on said wall surfaces and to thereby deposit said combustible liquors on all the upright walls of said chamber.

3. A furnace comprising upright walls forming the front, rear and sides of a chamber of rectangular horizontal cross-section, a hearth forming the bottom of said chamber, means forming an outlet from the upper portion of said chamber for gaseous products of combustion generated in said chamber, spray nozzle means positioned substantially transversely midway of said front and rear walls and at a common elevation, each of said spray nozzle means formed to project a coarse spray of combustible liquor in sheet form through an angle of substantially 180 degrees across the upper portion of said chamber to impinge on the opposite wall and the side walls so as to deposit an adhering mass of liquor thereon, and means for continuously vertically oscillating each of said nozzle means about a transverse horizontal axis, stop means on said vertical oscillating means being arranged to limit the upper level of said impinging spray to a position below the level of the spray nozzle means in the opposite wall.

References Cited by the Examiner
UNITED STATES PATENTS

| | | | |
|---|---|---|---|
| 2,161,110 | 6/39 | Tomlinson et al. | 122—7 |
| 2,541,695 | 2/51 | Gangewere | 23—48 X |
| 2,550,676 | 5/51 | Dalin | 23—262 |
| 2,636,813 | 4/53 | Singleton | 122—7 |
| 2,946,669 | 7/60 | Coulter et al. | 22—48 X |

JAMES W. WESTHAVER, *Primary Examiner.*

JOHN J. CAMBY, *Examiner.*